United States Patent
Dorland et al.

(10) Patent No.: US 7,047,531 B2
(45) Date of Patent: May 16, 2006

(54) METHOD AND APPARATUS FOR AUTOMATED NETWORK POLLING

(75) Inventors: Chia-Chu Dorland, Fort Collins, CO (US); Gautam Mehrotra, Fort Collins, CO (US); Mark A Schilling, Fort Collins, CO (US); Richard B. Whitner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 840 days.

(21) Appl. No.: 10/194,669

(22) Filed: Jul. 11, 2002

(65) Prior Publication Data

US 2004/0010551 A1    Jan. 15, 2004

(51) Int. Cl.
    *G06F 9/46*    (2006.01)

(52) U.S. Cl. ............... 718/103; 709/223; 709/224

(58) Field of Classification Search ........ 718/100–103; 709/223–226; 719/316
See application file for complete search history.

(56) References Cited

U.S. PATENT DOCUMENTS

| 5,623,668 | A | * | 4/1997 | Nieuwenhuizen | ........... 718/100 |
| 5,710,885 | A | * | 1/1998 | Bondi | ................ 709/224 |
| 5,862,338 | A | * | 1/1999 | Walker et al. | ............ 709/224 |
| 6,941,350 | B1 | * | 9/2005 | Frazier et al. | ............ 709/209 |
| 2004/0015974 | A1 | * | 1/2004 | Jeyaraman | ................. 718/104 |
| 2005/0005011 | A1 | * | 1/2005 | DeLuca et al. | ............ 709/224 |

OTHER PUBLICATIONS

IBM Technical Disclosure Bulletin. "Enhanced Method for Monitoring Critical Resources in Token Ring Networks." Jan. 1997.*

* cited by examiner

*Primary Examiner*—Lewis A. Bullock, Jr.

(57) ABSTRACT

A system wherein work orders are used to accomplish polling of devices on a network. Work orders are created and passed to a scheduler which places the work order into one of a plurality of queues, based on the priority of the work order. As work orders are pulled from each of the queues, each work order is sent to a thread pool matching the priority, where the work order is executed. Within each work order is a run process that performs the actual polling of the node.

15 Claims, 7 Drawing Sheets

METHOD AND APPARATUS FOR AUTOMATED NETWORK POLLING

TECHNICAL FIELD

This invention relates to Computer Systems and more particularly to networks of computer systems. Even more particularly, the invention relates to a method and apparatus for sending poll commands to devices attached to computer networks.

BACKGROUND OF THE INVENTION

Computer networks are collections of hardware and software that connect computers and allow them to send information from one computer to another electronically. A computer network is comprised of the physical hardware connections between the various computers, for example telephone lines, coax cable or fiber optic cable, and the software used to send and receive data and to route the data to the selected computer on the network.

A local area network (LAN) is a network connection between computers in close proximity, typically less than one mile. A wide area network (WAN) is a network of computers located at longer distances, often connected by telephone lines, dedicated long-range communication lines, or satellite links. The Internet is an example of a very large wide area network. Network software may sometimes be used with both types of networks.

When a network is fast growing, that is, network elements or nodes are being added frequently, a network administrator may not know all of the nodes connected to the network. Also, a network administrator new to his or her job may not be familiar with the nodes on the network. Determining the nodes manually is a difficult problem. The administrator may contact all the users of the network known to the administrator, however, infrequent users may be forgotten and not contacted. Also, if a node is connected to the network, but not active because the computer is not powered up or is inoperative, that node may not be included in the list. In a very short local area network, a network administrator may physically trace the cable of the network to determine which nodes are located on the network. However, since longer local area networks can extend over a mile, through many floors and offices within a building, physical tracing may be impossible. In a wide area network, physical tracing is almost always impossible.

For some commonly used networks, special equipment can be purchased that will determine the nodes located on the network and the distance between them. This equipment, called a probe, is often limited by the other components of the network, however. For example, in a local area network, a repeater unit may be used to extend the effective distance of the local area network to a distance greater than is capable with a single cable. A repeater unit amplifies signals, and therefore might not allow a probe to determine the location of nodes beyond the repeater.

Other units connected to the network may obscure nodes. For example a bridge unit connects two similar networks but only passes messages that are being sent from a node on one side of the bridge to a node on the other side of the bridge. It will not pass messages between nodes on the same side, in order to reduce the traffic on the other side of the bridge. A bridge will prevent a probe from determining the nodes on the other side of the bridge. A gateway is a unit that connects dissimilar networks to pass messages. Because a gateway may have to reformat a message to accommodate a different network protocol, it might prevent a probe from finding nodes beyond the gateway.

One problem with determining the nodes of a network is that when the network is large, polling all the nodes is very time consuming. Furthermore, to keep an accurate description of all the nodes and the configuration of each node requires that the nodes be polled frequently, thus polling efficiencies are important There is need in the art then for a method of polling the nodes on a network. There is further need in the art for efficiently polling such nodes. The present invention meets these and other needs in the art.

DISCLOSURE OF THE INVENTION

A work order system wherein a work order is used to accomplish a single poll of a single device. When a work order is created it is passed to a work order scheduler which places the work order into one of a plurality of queues based on a priority of the work order. As work orders are pulled from each of the queues each work order is sent to a thread pool based on the priority of the work order. The thread pool performs a run process within the work order to accomplish the polling.

DESCRIPTION OF THE DRAWINGS

The above and other aspects, features, and advantages of the invention will be better understood by reading the following more particular description of the invention, presented in conjunction with the following drawings, wherein.

DETAILED DESCRIPTION

This description is not to be taken in a limiting sense but is made merely for the purpose of describing the general principles of the invention. The scope of the invention should be determined by referencing the appended claims.

One embodiment of the invention is a work order system wherein a work order is used to accomplish a single poll of a single device. When a work order is created it is passed to a work order scheduler which places the work order into one of a plurality of queues based on a priority of the work order. As work orders are pulled from each of the queues each work order is sent to a thread pool based on the priority of the work order. The thread pool performs a run process within the work order to accomplish the polling.

Each thread pool is processed in parallel with the other thread pools in a multi-tasking operating system, thus each poll is being performed in parallel with other polls to increase the efficiency of the overall polling system.

The run process within each work order performs the actual polling of the node. The run process is a virtual function, which is implemented in the class defined by the user of the polling system. This makes the process of performing a poll on any particular device independent of the overall work order system, thus allowing polling of newly developed devices to easily be incorporated into the work order system, without having to modify the work order system itself.

The implementation of the run process within the work order also allows the run process to be any type of process, thus the run process is not limited to polling.

Work orders may contain a recurring interval time or a next schedule time or both. A recurring interval causes the work order to be rescheduled each time it is performed, and a next schedule time causes the work order to be rescheduled once. Demand work orders may be done immediately, effectively by scheduling them to be done now.

Figure 1:
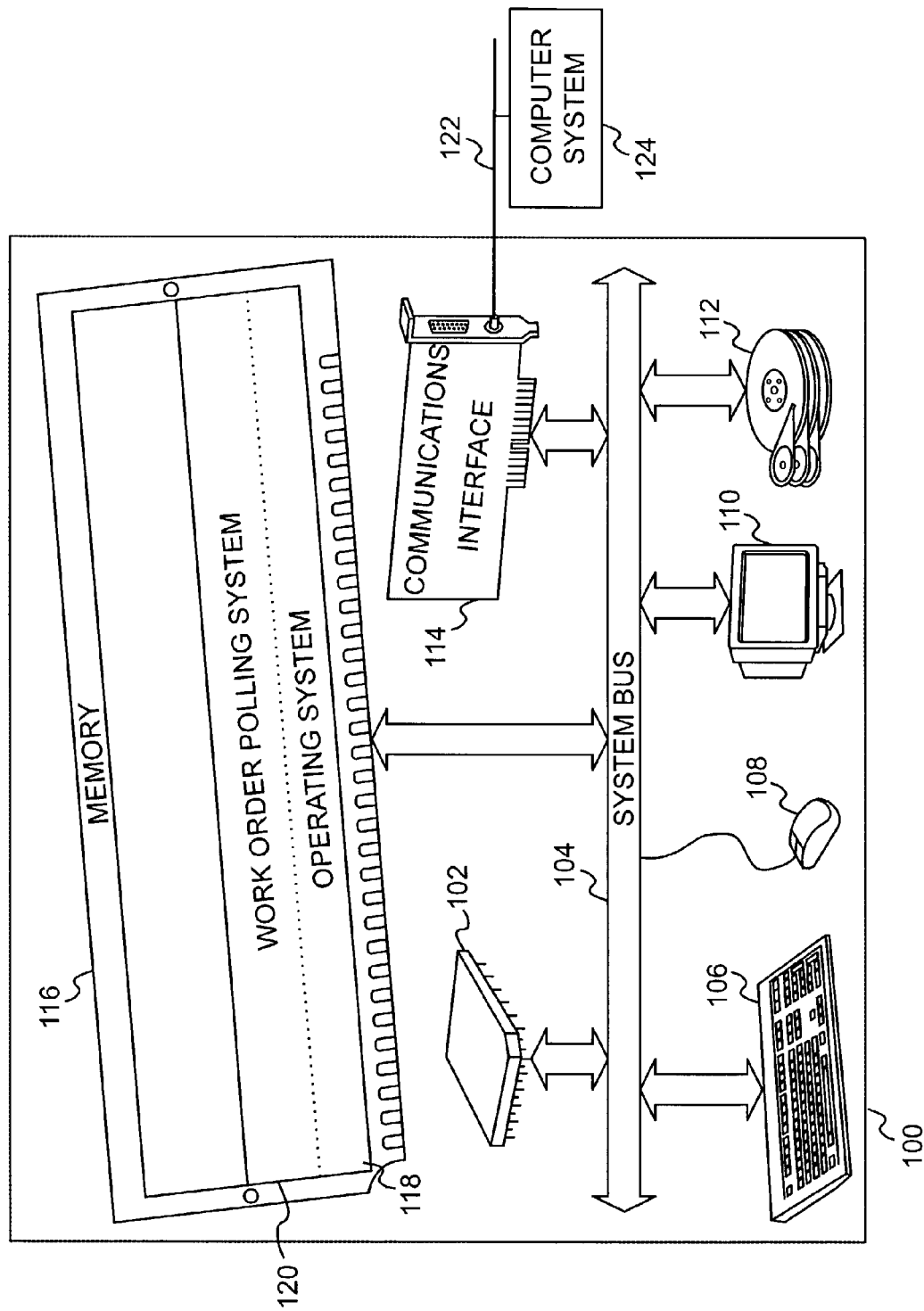
FIG. 1 shows a block diagram of an embodiment of a computer system containing the polling system of the invention.

FIG. 1 shows a block diagram of a computer system containing the work order polling system. Referring to FIG. 1, a computer system 100 contains a precessing element 102 that communicates to other elements of the computer system 100 over a system bus 104. A keyboard 106 and graphical input device 108 are used to input data into the computer system 100, while data and graphics are output through a display device 110. A data storage device 112 is used to store the software and data of the invention.

A memory 116 contains an operating system 118, which may be any one of the operating systems typically used in computer systems today. Within the memory 116 is the work order polling system 120, which polls other computer systems 124 over a network 122 through a communications interface 114.

Figure 2:
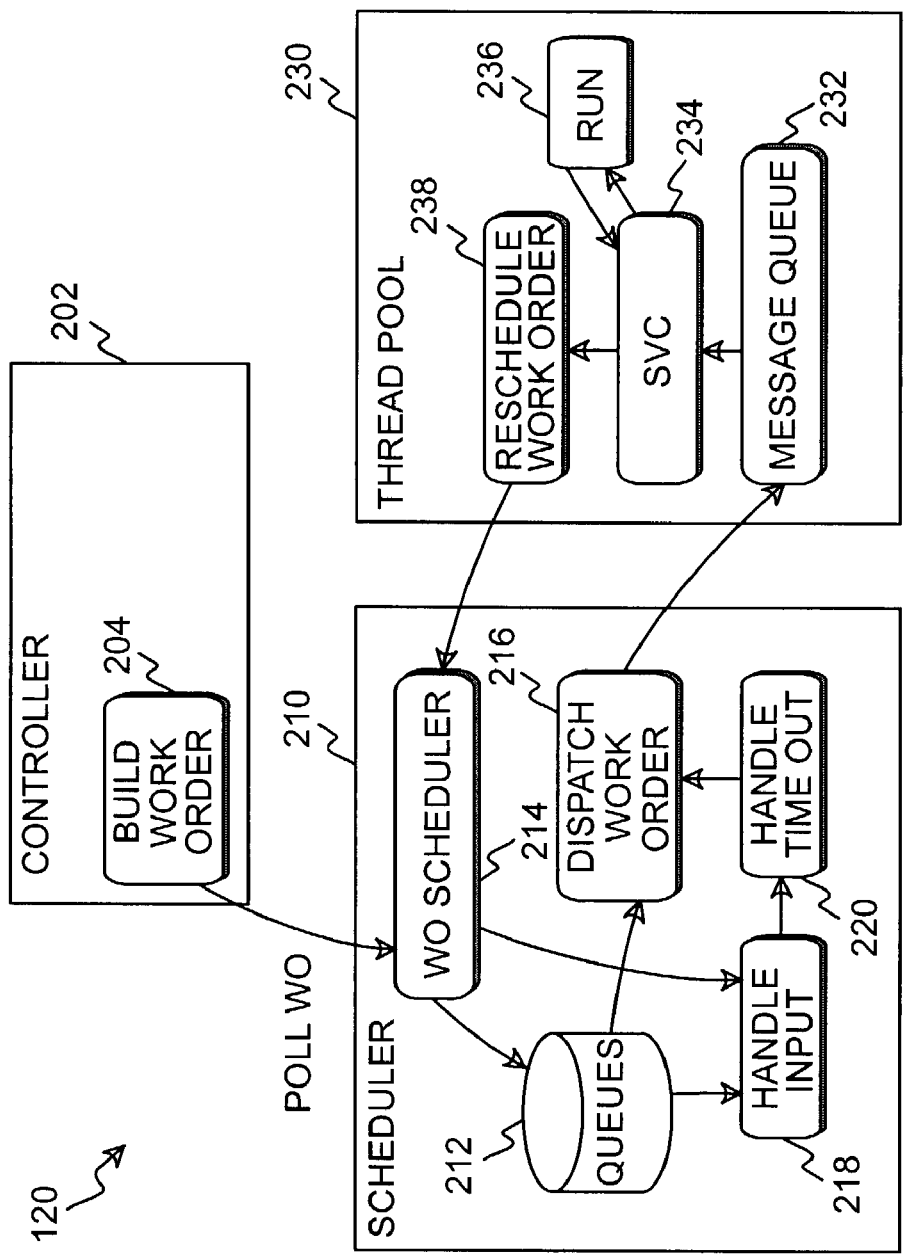
FIG. 2 shows a block diagram of an embodiment of the polling system of the invention.

FIG. 2 shows a block diagram of the processes of the work order polling system 120 of FIG. 1. Referring to FIG. 2, a controller process 202, which is typically an application program, contains a build work order process 204 that creates the work orders for each poll to be completed, typically, one work order for each device to be polled, although a work order also can be created for polling multiple devices. The tasks defined inside the work order can be very different in their scope. For example, one work order may poll data from one device or multiple devices, another work order may perform discovery of new devices, and still another work order may update the database. When a poll work order is created, it is passed to a work order scheduler 214 within the scheduler process 210. The work order scheduler 214 places the poll work order into one of a plurality of queues 212. When a work order is to be dispatched, a dispatch work order process 216 pulls the work order from one of the queues 212 and sends the work order to a message queue 232 within a thread pool 230. An SVC process 234 within the thread pool 230 removes the poll work order from the message queue 232 and executes the run process 236 contained within the work order. The run process 236 actually performs the polling.

An SVC process is a starting execution point for threads. When threads are activated, the SVC method for each thread will be invoked to receive the message for the message queue.

In a multi-tasking operating system, each thread pool runs as a separate task, thus achieving parallel operation of the threads. In a distributed environment, each thread pool may run on a separate processor, further increasing parallel operation of the threads.

In addition to executing the run process 236, the SVC process 234 also passes the work order to a reschedule work order process 238 which determines whether the work order is to be rescheduled for a future polling or other function. If the work order is to be rescheduled, scheduled work order process 238 passes the work order back to the work order scheduler 214.

Referring back to the scheduler process 210, when the work order scheduler 214 places a work order into one of the queues 212, it also notifies a handle input process 218 which examines the schedule time for the work order and sets a timeout for the next work order to be scheduled. Once this time out occurs, a handle timeout process 220 notifies the dispatch work order process 216 that a work order is to be scheduled.

Network discovery is done with discovery tasks invoked through work orders. That is, the run process of a work order performs network discovery. Network discovery may be done by many methods, for example by sending a ping message to all possible nodes on a sub network and noting those nodes that respond to the ping, since a node must be present to respond to a ping message. If a network discovery run process discovers another node, the database is updated to add the new node, however the network discovery task will not poll the node at that time. Instead, for each node found, another work order is scheduled to poll the newly found node.

Figure 3:
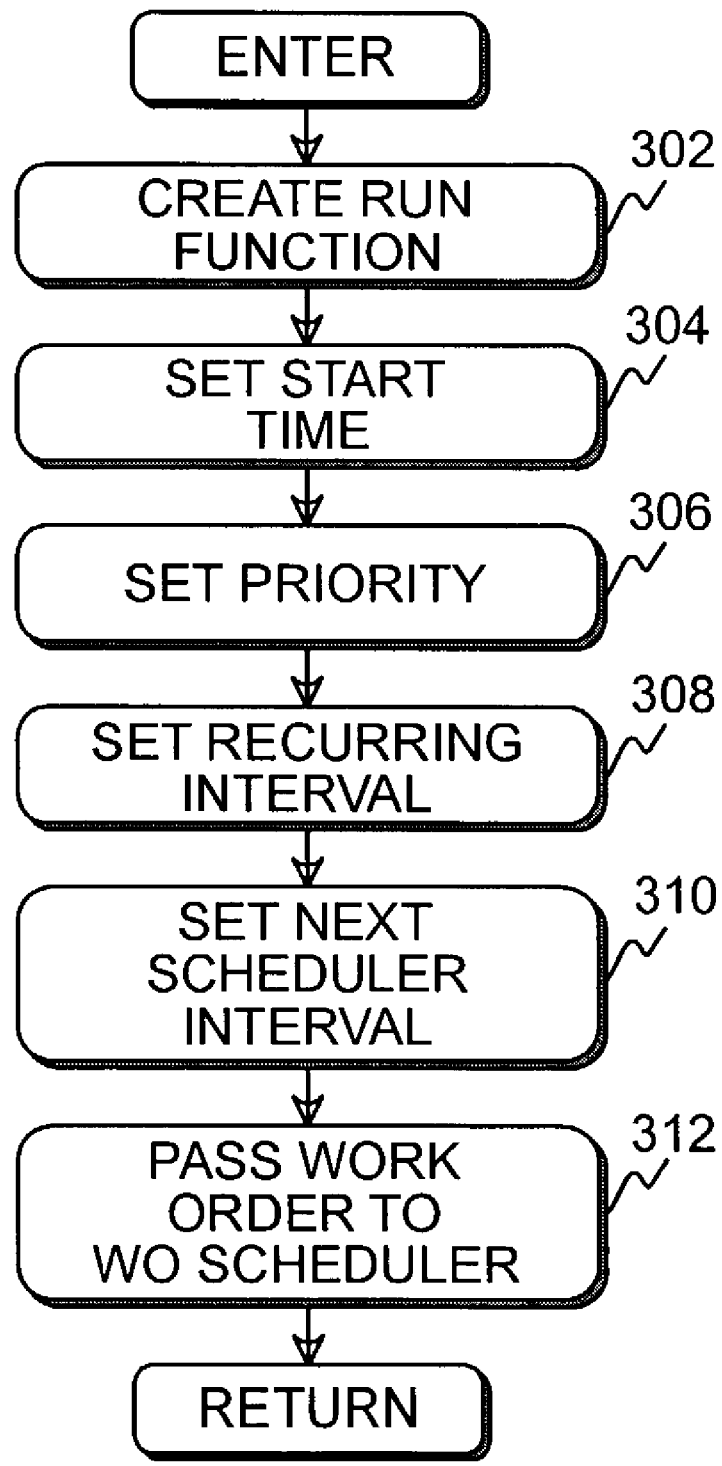
FIG. 3 shows a flowchart of an embodiment of the build work order process of the polling system.

FIG. 3 shows a flowchart of the build work order process 204 of FIG. 2. Referring to FIG. 3, the build work order process will be called from some other process within the controller 202 (FIG. 2) and when called, the process will start at step 302. Step 302 creates the run function that will be executed to perform the actual poll of the network device. In one embodiment, the run function is defined in the polling system as a virtual function, which is then implemented in the class defined by the user of the polling system. This implemented virtual function performs the actual polling operations to the device being polled, thus allowing for polling of newly developed devices to easily be incorporated into the polling system, when the devices are implemented. The run function source is pre-compiled into an executable module, and a pointer to the executable module is passed with the work order as a parameter when the work order is created. When the work order is performed, it performs the run function through the pointer.

Step 304 then sets the start time for the poll and step 306 sets the priority for the poll. Step 308 then sets a recurring interval if the poll is to be repeated periodically. Step 310 sets the next scheduled interval, if this is being used. The recurring interval causes the poll to be repeated after it is performed each time, whereas the next scheduled interval causes the poll to be repeated only once. These are mutually exclusive.

After these steps are completed step 312 passes the work order to the work order scheduler 214 (FIG. 2).

Figure 4:
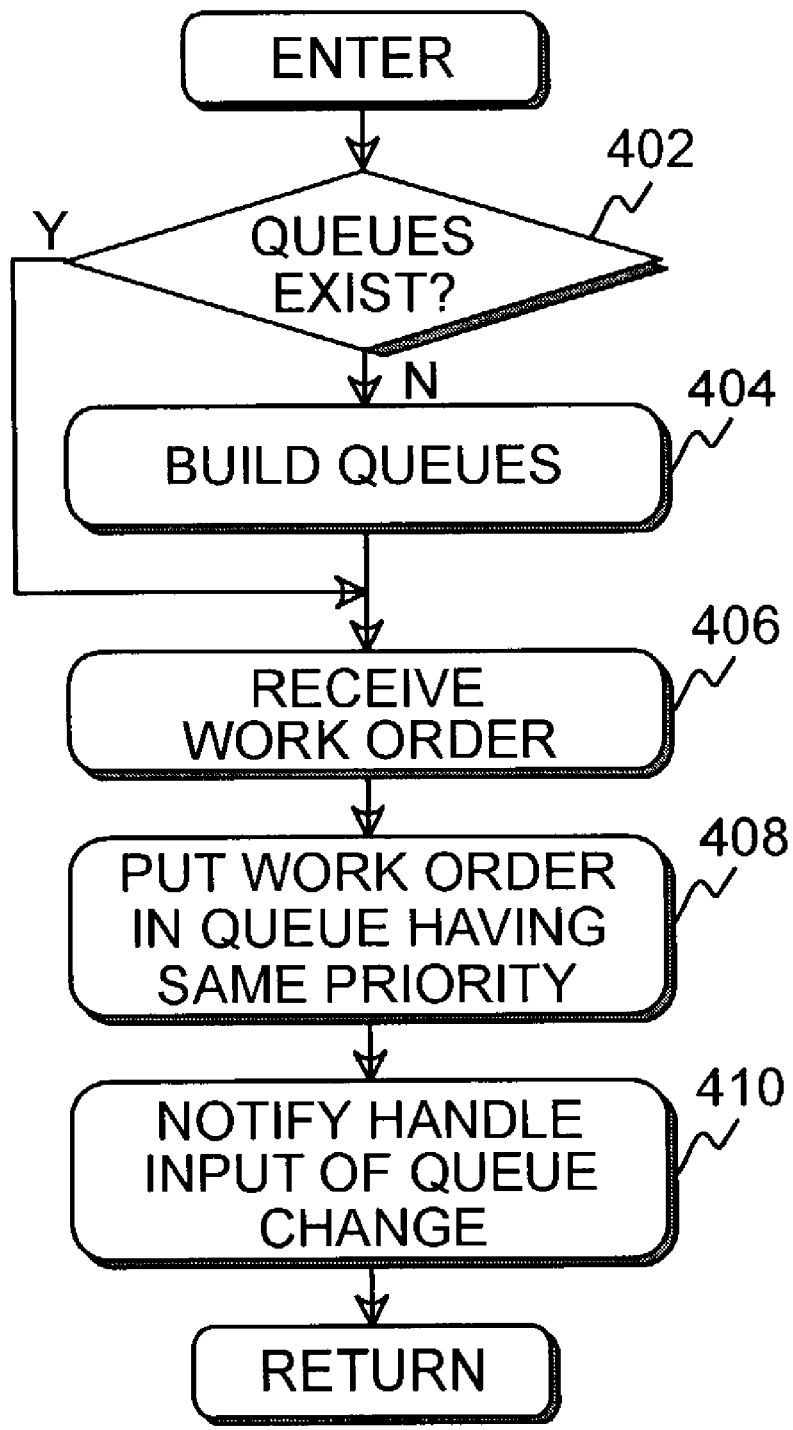
FIG. 4 shows a flowchart of an embodiment of the work order scheduler of the polling system.

FIG. 4 shows a flowchart of the process of the work order scheduler 214 (FIG. 2). Referring to FIG. 4, when a poll work order is passed to the work order scheduler, the process of the work order scheduler begins at step 402. Step 402 determines whether the queues 212 have been created, and if not, passes control to step 404 which creates the queues 212 (FIG. 2). After creating the queues, or if the queues have already been created, control goes to step 406 which receives the work order from either the build work order process 204 (FIG. 2) or the reschedule work order process 238 (FIG. 2). Step 408 then puts the work order into a queue having the same priority as the priority in the poll work order.

As described above, each work order is assigned a priority. There is at least one queue 212 for each of the priority levels that can be assigned to work orders. When multiple work orders have the same start time the priority will determine the order in which they are started.

After placing the work order in the queue 212, step 410 notifies the handle input process 218 (FIG. 2) that a new work order has been placed into the queue. Control then returns to the caller.

Figure 5:
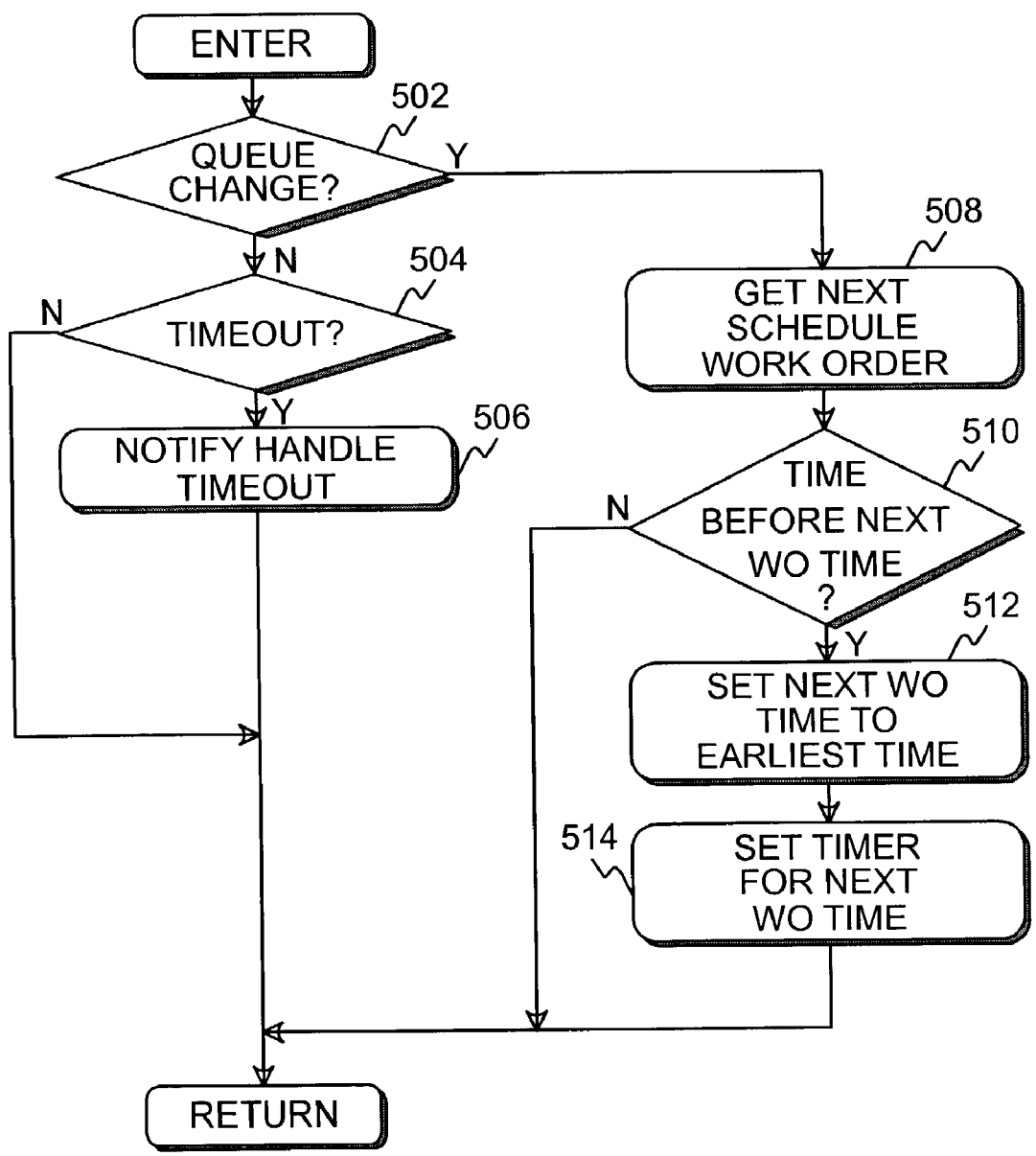
FIG. 5 shows a flowchart of an embodiment of the handle input process of the polling system.

FIG. 5 shows a flowchart of the handle input process 218 (FIG. 2) which sets timers for the next poll work order to be processed. Referring to FIG. 5, after entry, step 502 determines whether any of the queues have changed. If none of the queues have changed, step 502 goes to step 504 which determines whether a timeout has occurred. If a timeout has occurred, step 504 goes to step 506 which notifies the handle timeout process 220 that a timeout has occurred so that the handle timeout routine can start the process of polling.

If a queue has changed, step 502 goes to step 508 which gets the next scheduled work order from the queues. Step 510 determines whether the work order just placed into the queues is scheduled to start sooner than any of the work orders currently in the queue. If not, step 510 simply returns to the caller. If the time for the work order just received is earlier than any of the other work orders, step 510 goes to step 512 which sets the next work order time to the earliest time of any of the work orders. Step 514 then sets a timer for this time so that a timer will expire and the work order can be dispatched. Control then returns to the caller.

Figure 6:
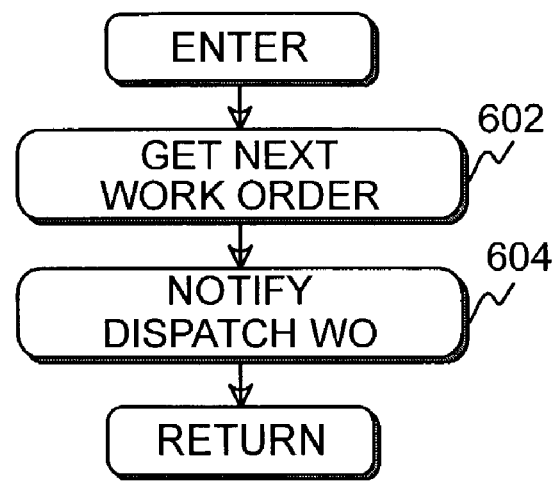
FIG. 6 shows a flowchart of an embodiment of the handle timeout process of the polling system.

FIG. 6 shows a flowchart of the handle timeout process 220 (FIG. 2). Referring to FIG. 6, after entry, step 602 retrieves the next work order from the queues 212 and step 604 notifies the dispatch process 216 that a work order is available to be dispatched.

Figure 7:
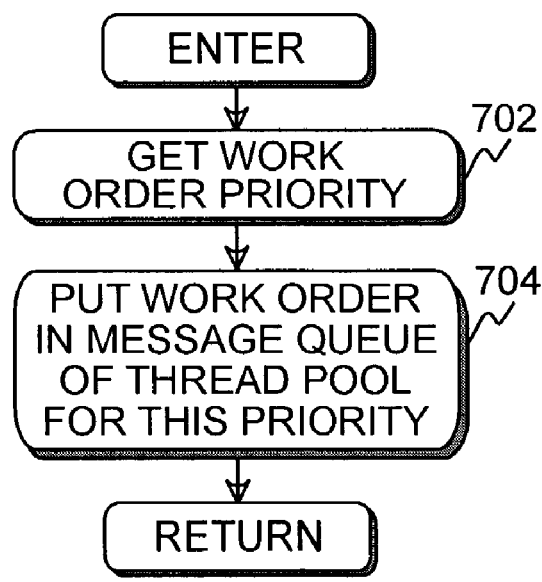
FIG. 7 shows a flowchart of an embodiment the dispatch process of the polling system.

FIG. 7 shows a flowchart of the dispatch work order process 216 of FIG. 2. Referring to FIG. 7, after entry, step 702 gets the work order priority of the work order passed from the handle timeout routine 220, and step 704 puts the work order into a message queue of a thread pool matching the priority of the work order. As discussed above, each work order has a priority, and there is at least one thread pool for each priority that any work order can have.

If a thread is not busy, and there are no more work orders having the same priority as the thread, a different priority work order can be dispatched to this thread.

Figure 8:
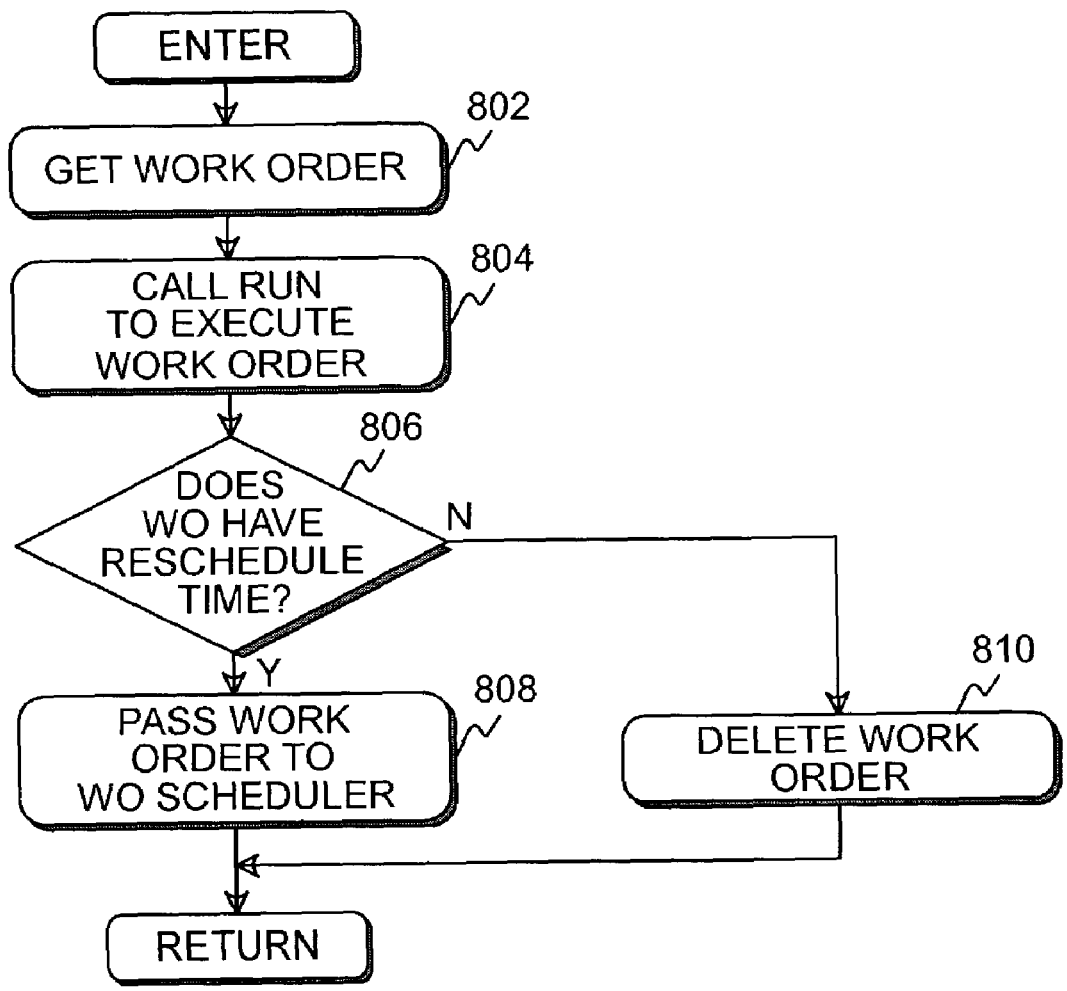
FIG. 8 shows a flowchart of an embodiment of the SVC process of the polling system.

FIG. 8 shows a flowchart of the SVC process 213 (FIG. 2) which processes poll work orders, and executes the run process within the poll work orders. Referring to FIG. 8, after entry, step 802 gets the work order from the message queue 232. Step 804 then calls the run process within the work order to perform the poll of the device on the network.

The run process notifies other process of the success or failure of the poll through an exit status variable. A common log file also contains the results of each task performed by the work orders. The run function may or may not handle failure results.

Step 806 then determines whether the work order contains a reschedule interval, or a next scheduled time, and if so, step 806 goes to step 808 which passes the work order back to the work order scheduler process 214 (FIG. 2).

When the work order contains a reschedule interval, the work order is scheduled to run at the current time plus the reschedule interval. This allows the work order to be rescheduled indefinitely until it is canceled, or deleted, by the controller or some other process. It can be canceled by a cancel work order containing a run process which performs the cancel.

When the work order contains a reschedule time, it is scheduled to run at that time unless the reschedule time is less than the current time, wherein the work order is deleted. This allows the work order to be rescheduled once, and then deleted.

If the work order does not have a reschedule interval, or a next scheduled time, step 806 goes to step 810 which deletes the work order so that it is not reprocessed.

Since the run process is contained within the work order, the process of doing the polling is not dependent upon the work order system. That is, any type of process can be performed by the run process, thus the system is not limited to polling operations.

Having thus described the invention, it will be understood by those skilled in the art that many changes in construction and circuitry and widely differing embodiments and applications of the invention will suggest themselves without departing from the scope of the invention as defined in the claims. The disclosures and the description herein are intended to be illustrative and are not in any sense limiting of the invention, defined in scope by the following claims.

What is claimed is:

1. A method for polling a plurality of network nodes, said method comprising the steps of:
   (a) creating a polling work order comprising creating a run process and storing said run process within said polling work order, defining a priority and storing said priority within said polling work order, and establishing a run time for executing said run process and storing said run time within said polling work order;
   (b) queuing said polling work order in one of a plurality of queues, wherein said polling work order is queued in a queue matching said priority stored in said polling work order;
   (c) removing said polling work order from said one of said plurality of queues at a time of said run time stored in said work order and sending said polling work order to one of a plurality of thread pools, wherein said polling work order is sent to a thread pool matching said priority stored in said polling work order; and
   (d) executing said run process in said thread pool.

2. The method of claim 1 further comprising the following step (a1) performed after step (a), and further comprising the following steps (e) and (f) performed after step (d):
   (a1) creating a reschedule time and storing said reschedule time within said polling work order;
   (e) when said reschedule time is greater than a current time, performing step (b) to place said polling work order back into a queue at its reschedule time; and
   (f) when said reschedule time is less than or equal to a current time, deleting said polling work order.

3. The method of claim 1 further comprising the following step (a1) performed after step (a), and further comprising the following steps (e) and (f) performed after step (d):
   (a1) creating a reschedule interval and storing said reschedule interval within said polling work order, wherein said reschedule interval comprises an interval greater than or equal to zero;
   (e) when said reschedule interval is greater than zero, performing step (b) to place said polling work order back into a queue at a future time comprising the time of completion of said polling work order run process plus said reschedule interval; and (f) when said reschedule interval is zero, deleting said polling work order.

4. The method of claim 1 wherein said run process is created from a virtual function.

5. The method of claim 1 wherein step (a) further comprises the following step (a1) and wherein step (d) further comprises the following step (d1):
   (a1) creating a polling work order having a run process for discovering at least one node of a network; and
   (d1) creating a polling work order for polling said node discovered by said run process for discovering at least one node of a network created in step (a1).

6. A method for polling a plurality of network nodes, said method comprising the steps of:
   (a) creating at least two polling work orders, each having a run process stored within a respective polling work order;
   (b) defining a priority with each of said at least two polling work orders;
   (c) establishing a run time for executing said run process within each of said at least two polling work orders;
   (d) queuing each of said polling work orders in one of a plurality of queues, wherein each polling work order is queued in a queue matching said priority within said polling work order;
   (e) removing one of said polling work orders from said one of said plurality of queues at a time of said run time for said one of said polling work orders;
   (f) sending said polling work order removed in step (e) to one of a plurality of thread pools, wherein said polling work order removed in step (e) is sent to a thread pool matching said priority within said polling work order;
   (g) executing said run process in said thread pool; and
   (h) processing steps (e) through (g) for each polling work order created in step (a) in parallel with other processing of steps (e) through (g).

7. The method of claim 6 further comprising the following step (a1) performed after step (a), and further comprising the following steps (g1) and (g2) performed after step (g):
   (a1) creating a reschedule time within said polling work order;
   (g1) when said reschedule time is greater than a current time, performing step (d) to place said polling work order back into a queue at said reschedule time; and
   (g2) when said reschedule time is less than or equal to a current time, deleting said polling work order.

8. The method of claim 6 further comprising the following step (a1) performed after step (a), and further comprising the following steps (g1) and (g2) performed after step (g):
   (a1) creating a reschedule interval within said polling work order wherein said reschedule interval comprises an interval greater than or equal to zero;
   (g1) when said interval is greater than zero, performing step (d) to place said polling work order back into a queue at a future time comprising the time of completion of said polling work order run process plus said interval; and
   (g2) when said interval is zero, deleting said polling work order.

9. The method of claim 6 wherein said run process is created from a virtual function.

10. The method of claim 6 wherein step (a) further comprises the following step (a1) and wherein step (g) further comprises the following step (g1):
   (a1) creating a poll work order for discovering at least one node of a network; and
   (g1) for each node discovered by said poll work order created in step (a1), creating a polling work order for polling said discovered node.

11. A computer implemented system for polling a plurality of network nodes, said system comprising:
   a build work order subsystem for creating a plurality of work orders, wherein each work order comprises a run process stored in said work order, a priority stored in said work order, and a run time for executing said run process stored in said work order;
   a scheduler subsystem connected to said build work order subsystem, said scheduler subsystem comprising a plurality of queues, one queue for each priority that can be created in a work order by said build work order subsystem;
   a thread pool subsystem connected to said scheduler subsystem, wherein said thread pool subsystem comprises a plurality of thread pools, at least one for each priority;
   wherein said scheduler stores each polling work order created by said build work order subsystem in a one of said plurality of queues that matches said priority stored in said work order, and further wherein said scheduler subsystem removes said polling work order from said one of said plurality of queues at a time matching said run time stored in said work order and sends said polling work order to a one of said plurality of thread pools that matches said priority stored in said work order, and further wherein said thread pool executes said run process in said thread pool.

12. The system of claim 11 further comprising:
   a reschedule time within each polling work order; and
   wherein after said thread pool performs said run process, when said reschedule time is greater than a current time, said thread pool subsystem returns said work order to said scheduling subsystem which places said polling work order back into a queue at said reschedule time, and when said reschedule time is less than or equal to a current time, said thread pool deletes said polling work order.

13. The system of claim 11 further comprising:
   a reschedule interval stored within said polling work order wherein said reschedule interval comprises an interval greater than or equal to zero; and
   wherein after said thread pool performs said run process, when said reschedule interval is greater than zero, said thread pool returns said work order to said scheduling subsystem which places said polling work order back into a queue at a future time comprising the time of completion of said polling work order run process plus said reschedule interval, and when said reschedule interval is zero, said thread pool deletes said polling work order.

14. The system of claim 11 wherein said run process is created from a virtual function.

15. The system of claim 11 wherein said build work order subsystem creates a poll work order for discovering at least one node of a network, and for each node discovered by said poll work order, said thread pool subsystem builds a polling work order for polling said discovered node.

* * * * *